United States Patent
Offer

[19]

[11] Patent Number: 5,852,271
[45] Date of Patent: Dec. 22, 1998

[54] WATER EXCLUSION DEVICE FOR UNDERWATER THERMAL PROCESSING

[75] Inventor: Henry Peter Offer, Los Gatos, Calif.

[73] Assignee: General Electric Company, San Jose, Calif.

[21] Appl. No.: 631,188

[22] Filed: Apr. 12, 1996

[51] Int. Cl.[6] .................................................. B23K 9/16
[52] U.S. Cl. ............................................................ 219/72
[58] Field of Search ........................... 219/72, 70, 121.5, 219/136, 137.42; 277/611, 653

[56] References Cited

U.S. PATENT DOCUMENTS

| | | | |
|---|---|---|---|
| 4,035,602 | 7/1977 | Berghof | 219/72 |
| 4,087,670 | 5/1978 | Miller | 219/72 |
| 4,780,944 | 11/1988 | Niinivaara et al. | 219/70 |
| 5,022,663 | 6/1991 | Fages et al. | 277/610 |

*Primary Examiner*—Clifford C. Shaw
*Attorney, Agent, or Firm*—James E. McGinness; Dennis M. Flaherty

[57] ABSTRACT

A submersible thermal processing apparatus including a welding torch having an electrode, a housing and an inlet for pressurized gas; a shielding gas nozzle mounted to the torch housing and surrounding at least a portion of the electrode; and a fluid-permeable baffle made of elastic, heat-resistant spring material arranged in a closed loop and mounted to a distal end of the shielding gas nozzle. This water exclusion device acts as a movable, flexible, gas-flow permeable baffle, and is used in contact with and/or close proximity to the workpiece surface. One preferred shape of the cross section of the device is elliptical, with the coils of the spring inclined at an angle to the general path around the device so as to allow the overall helix shape to be readily compressed and released through larger deflections than the conventional design of baffle. This shape allows the device to more easily conform to the work surface local and general undulations, thereby providing a more positive gas-to-water interface boundary. The baffling action of the device is to generate a path of high liquid flow resistance at the gas-liquid interface, while allowing an escape path for the continuously replenished inert gas flow which carries away the liquid vapor (such as steam) evaporated from the work surface.

20 Claims, 2 Drawing Sheets

WATER EXCLUSION DEVICE FOR UNDERWATER THERMAL PROCESSING

FIELD OF THE INVENTION

This invention generally relates to underwater thermal processing of metal components. In particular, the invention relates to devices for excluding water from the process gas-purged zone during underwater thermal processing, such as weld cladding and joining, thermal spraying, thermal cutting and heat treatment.

BACKGROUND OF THE INVENTION

The liquid metal pool and adjacent heated metal existing during a welding process must be surrounded by a non-oxidizing environment such as the commonly used inert gas (argon or helium) shield. When welding is performed underwater, two available options are to: (1) provide a fixed-position dry environmental chamber completely around the welding equipment and weld area, or (2) provide a movable local dry environment around the torch end and weld area only. The local enclosure option may also include part or all of the weld torch, as desired, since the torch typically moves during the progression of the weld. The quality of the weld is a strong function of the ability of the water exclusion device to adequately conform tightly to the work piece surface while sliding over it, and therefore to keep the immediate weld area surface, including the purge gas in contact with it, dry and continuously purged of liquid vapor and oxidizing or other contaminants.

To eliminate or reduce stress corrosion cracking (SCC) in operating boiling water reactor (BWR) plants, the need exists during their maintenance outages for underwater welding in the form of cladding, joining and structural repairs. This welding may be performed either with or without the use of noble metal technology for SCC mitigation. For example, it is known to use a plasma transferred arc (PTA) and laser cladding processes, with particular emphasis on noble metal cladding (NMC) applications, which processes require the use of a local water exclusion device. The use of a local water exclusion device can be expanded in the future to welding applications beyond cladding, such as cutting, joining, crack healing and structural repairs. Other thermal processes, such as heat treating and thermal spraying, are also desired to be performed underwater in a locally water-excluded, rather than a generally encapsulated, dry type of gas environment.

One existing design for a local water exclusion device currently utilized for underwater PTA welding (also known as plasma arc welding) has various deficiencies. For example, the existing design has a torch-to-work distance sensitivity which is considered excessively high for some field applications. The result of this high sensitivity is less tolerance to both variations of the work surface contour and local surface roughness, especially for dynamic water exclusion applications. These conditions can lead to an increasing need for a more accurately controlled torch robotic positioner. Without a smoother surface and/or a more accurate controller, the weld quality and repeatability can be degraded. In addition, the existing method utilizes a strip of woven metal mesh fastened by resistance spot welding around the end of the extended gas cup. The existing metal mesh is made of relatively fine, soft wire gage which, because of its loose construction and low elastic limit (material yield strength), is fragile and insufficiently compliant.

SUMMARY OF THE INVENTION

The present invention is a device for providing improved exclusion of water from a process gas-purged zone during underwater thermal processing, such as weld cladding and joining, thermal spraying, thermal cutting and heat treatment. For example, the device allows welding in a locally dry environment on components which are submerged in water (or other liquids), resulting in higher weld quality as is typically found for work performed in a completely dry environment. The preferred embodiment of the device comprises a helical coil-shaped elastic, heat-resisting material, such as a metal spring, formed into a closed path around and attached to the shielding gas cup.

The water exclusion device in accordance with the invention acts as a movable, flexible, gas-flow permeable baffle, and is used in contact with and/or close proximity to the workpiece surface. One preferred shape of the cross section of the device is elliptical, with the coils of the spring inclined at an angle to the general path around the device so as to allow the overall helix shape to be readily compressed and released through larger deflections than the conventional design of baffle. This shape allows the device to more easily conform to the work surface local and general undulations, thereby providing a more positive gas-to-water interface boundary. The baffling action of the device is to generate a path of high liquid flow resistance at the gas-liquid interface, while allowing an escape path for the continuously replenished inert gas flow which carries away the liquid vapor (such as steam) evaporated from the work surface. This flow resistance is also provided in order to minimize or eliminate the local turbulence in the water at the edges of the exclusion device that would be present if a clearance existed between the work surface and the gas shield while higher pressure gas escaped from the shield and bubbled into the surrounding lower pressure water The water exclusion device in accordance with the present invention is an improvement on the existing design currently utilized for underwater PTA welding.

The new design has reduced torch-to-work distance sensitivity, resulting in more tolerance to both variations of the work surface contour and to the presence of local surface roughness, especially for dynamic water exclusion applications. An additional benefit of the improved water exclusion device is that the purge gas flow rate may be decreased for some applications, while maintaining greater compliance of the baffle portion of the device, or of both the baffle and the gas shroud to which it is mounted.

DETAILED DESCRIPTION OF THE PREFERRED EMBODIMENTS

Figure 1:
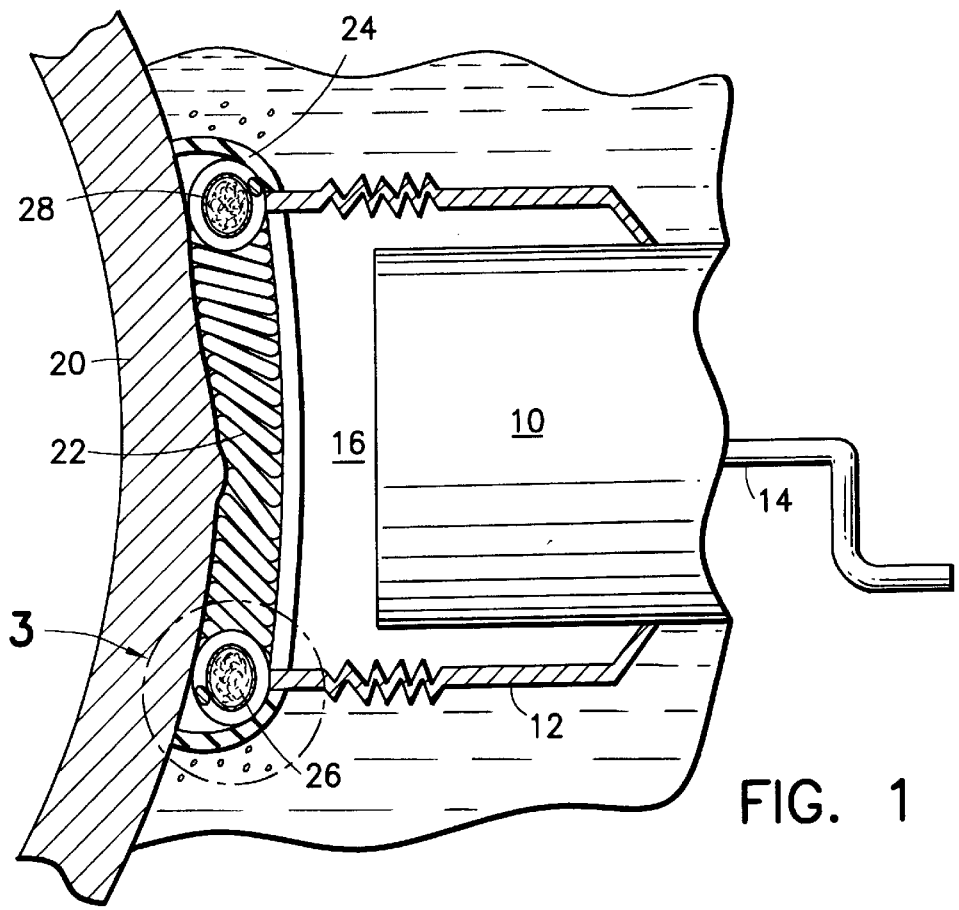
FIG. 1 is a schematic showing a sectional view of a water exclusion device with a coiled spring gas/liquid baffle mounted on an underwater welding torch in accordance with a preferred embodiment of the invention.

Referring to FIG. 1, the water exclusion device of the present invention is used in conjunction with a welding torch comprising a shielding gas cup 10, a shielding gas nozzle 12 in the form of a bellows, a shielding gas inlet 14 and a welding electrode (not shown). For tungsten inert gas welding, filler material is fed under the welding electrode by a filler nozzle (not shown). For metal inert gas welding, a consumable electrode (not shown) is fed to the work surface. Pressurized inert gas is supplied into the zone 16 between the shielding gas nozzle 12 and work surface 20 via shielding gas inlet 14.

Figure 2:
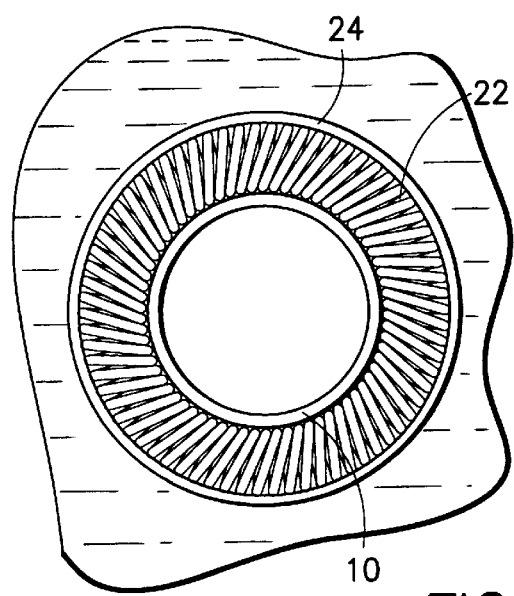
FIG. 2 is a schematic showing a plan view of the water exclusion device of FIG. 1, with the shielding gas cup not shown for the sake of clarity.
Figure 3:
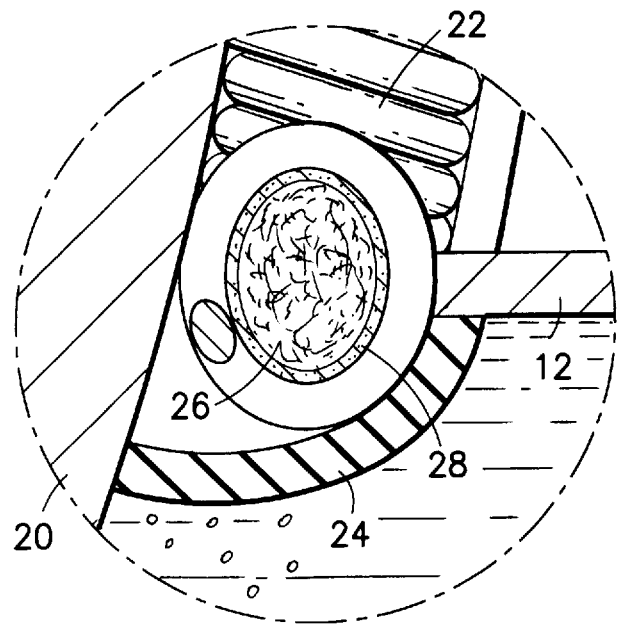
FIG. 3 is a schematic showing a magnified sectional view of the portion of the water exclusion device indicated by circle 3 in FIG. 1.

During underwater thermal processing, water must be excluded from the shielding gas-purged zone 16. In accordance with a preferred embodiment of the present invention, the water exclusion device comprises a helical coil 22 made of elastic, heat-resisting material, such as spring steel. In the preferred embodiment, the spring is joined at its ends to form a toroidal-shaped baffle, best seen in FIG. 2. One preferred shape of the cross section of the helical coil 22 is elliptical (best seen in FIG. 3), with the coils of the spring inclined or canted at an angle relative to the general path around the baffle to allow the overall helix shape to be readily compressed and released through large deflections. This configuration allows the baffle to easily conform to the work surface local and general undulations, thereby providing a more positive gas-to-water interface boundary. As seen in FIG. 1, the turns of the coiled spring conform to the terrain of the work surface by adjusting their respective angles of inclination.

Other materials with different moduli of elasticity (Young's modulus), such as nickel-base Hastelloy, may be used to reduce the spring constant of the baffle enclosure, and therefore the force required to maintain essentially continuous contact to the work around the baffle perimeter.

Other shapes of the wire used to form the baffle enclosure can be used to adjust the spring constant of the coil formed from the wire. The standard wire cross-sectional shape used to form either canted-coil or non-canted coil springs is round wire. An improvement on this shape is the use of flat or oval wire, wound so that the wire is bent in its thin dimension as a coil is formed. In this coil configuration, the wire is also deflected in its thin dimension when the coil is sealed against a contoured or rough work surface, allowing the force to cause a given coil loop deflection to be less, as preferred, and/or allowing the maximum deflection before shape-damaging plastic (permanent) deformation of the wire occurs to be greater.

The baffling action of the helical coil 22 is to generate a path of high liquid flow resistance at the gas-liquid interface, while allowing an escape path for the continuously replenished inert gas flow which carries away the liquid vapor (such as steam) evaporated from the work surface. To improve the surface contour-following ability of the baffle, the helical coil 22 is mounted to a mechanically compliant shielding gas bellows 12 which can move independently to the welding torch shroud 10. In accordance with the preferred embodiment, the mechanical compliance is provided by the bellows of nozzle 12 without a mechanical joint, as depicted in the drawings. Alternatively, mechanical compliance can be provided by a spring-loaded sliding tube (such as a slip joint), a ball and socket joint, or a flexible bellows with a mechanical joint. However, it is not essential to practice of the present invention that the shielding gas nozzle be mechanically compliant. In accordance with further variations, a mechanically flexible spring-type baffle can be mounted on the shielding gas nozzle, or a rigid, adjustable-length extension of the shielding gas nozzle, either directly or via an integral mounting strongback attached to the baffle.

The flexible mounting of the water exclusion baffle allows the baffle to move (both rotate and translate relative to the plane of the work surface) as necessary to follow the work contour, which may result in a local path different than the path which the torch must follow in order to maintain a constant arc length and corresponding arc voltage. The difference between these paths occurs on contoured or irregular surfaces since the baffle contact location always leads the weld pool in the travel direction by approximately hair the width of the baffle's overall dimension, whereas the arc or power beam intersects the work closer to the center of the baffle.

The shielding gas nozzle 12 is fitted around the welding torch and contains remote viewing camera optics (not shown), which allow an operator to observe the weld in progress without viewing through a water environment containing gas bubbles or excessive liquid vapor. This real-time weld monitoring in turn allows the operator to make adjustments to the process based on the observed quality of the results achieved. One such adjustment is the purge gas flow rate required to maintain a sufficiently dry work surface for the local conditions.

In accordance with the preferred embodiment, the baffle construction includes an outer covering or skirt 24 made of a heat-resistant, flexible material, such as silicon rubber, which is compressed against or in close proximity to the work surface. The coil spring 22, or other functionally equivalent baffle enclosure, can provide general support as an integral stiffener to the skirt 24, yet allow the skirt portion protruding against the work to flex when required so as to maintain more continuous local contact. The coil spring 22 (and filler, if used), which is placed within the skirt 24, provides protection to the skirt material against infrared and ultraviolet radiation from the thermal process within. During thermal processing, the inert gas forced between adjacent turns of the coil escapes at the interface of the flexed skirt and the workpiece surface. In the alternative, the skirt can be made of gas-permeable material.

In accordance with the preferred embodiment of the water exclusion device, the coiled spring 22 surrounds a toroidal-shaped ring of gas-permeable gas/liquid baffle filler material 26, which is surrounded by a gas-permeable baffle filler sheath 28 made, e.g., of braided fiberglass. The filler material may take the form of a metallic nonwoven mesh, woven strip or wire rope, as well as non-metallic high-temperature inserts such as fiberglass braid and porous (open cell) silicon rubber sponge. Other variations of the filler placement include forming in place within the final shape of the baffle enclosure, such as molding sponge rubber in the inside of a coil spring.

Another variation is to make the baffle filler material 26 or the sheath 28 from a flexible material, such as high-temperature rubber, which is not significantly gas permeable. These configurations force most or all of the purge gas out from the exclusion device only where it contacts the work surface, which may be preferred for some applications, and may allow a reduction in the required purge gas flow rate through the water exclusion device. The filler may be molded into the baffle enclosure, or may be inserted as a separate piece of material such as tubing, coated mesh, or a solid strip before the ends of the enclosure are joined to form a closed perimeter around the exclusion device.

The disclosed device for the exclusion of water from a movable, local thermal processing zone applied underwater provides significantly improved performance relative to the conventional design. This performance benefit consists of better control of the water/gas boundary for rough and/or contoured work surfaces, with less sensitivity to variations in the torch to work distance and less positional accuracy required for the torch manipulation. The smooth shape and hard material of the baffle enclosure portion of the exclusion device (which is in sliding contact with the work surface) permit uniform and steady process application over rougher surfaces than is currently possible. The device can be applied to a variety of thermal processes when applied underwater, such as welding, cutting, coating, and heating.

The improvements of the present invention provide numerous performance benefits. For example, the baffle is preferably made of a heavy-gage hard spring steel wire or other forms of spring materials. The baffle is constructed so that a coil, or other shape fabricated from it, can be readily compressed by large percentages of its thickness (up to approximately 35%) with a relatively low compression force. The high elastic strain limit of the spring material allows it to avoid permanent deformation after compression, and to fully relax and return to its original shape before compression. The benefits of the design in accordance with the present invention are as follows:

(1) The spring is strong and durable to withstand sliding wear against a potentially rough welded work surface or abrasive machined surface.

(2) The spring is compliant and elastic, allowing complete compression and then full return to its original, uncompressed height.

(3) The spring's apparent fluid permeability (or low "density") is adjustable to control the gas flow rate required to displace the liquid/gas interface out of the dry weld process area.

(4) The spring can be readily attached directly to (or removed from) the gas cup or to an intermediate piece by mechanical or other means.

(5) The spring radial deflection force constant can be readily adjusted and controlled by tailoring the wire size and pitch.

(6) The rounded spring cross-sectional shape is able to readily slide over bumps and raised edges such as existing weld beads.

(7) The spring can be filled with an internal wire braid, mesh, rope or additional springs to achieve composite device improved performance characteristics. In particular, various combinations of nested (concentric) springs can be assembled to vary the spring constant and packing density.

(8) The spring is resistant to damage and clogging due to external abuse or weld spatter (and overspray for powder feed systems).

In accordance with an alternative preferred embodiment of the invention, the enclosure for the baffle can be a finger spring, with the general shape of the perimeter formed so as to enclose the torch end. The portion of the fingers in contact with the work surface may have a curved or radiused cross-sectional shape so as to slide easily over both relatively high and low areas if the thermal process is applied dynamically to the work. The "hand" part of the finger spring may be attached and sealed to the end of the torch, or to a compliant extension thereof. Several sets of overlapping springs can be used to assist in maximizing the baffling action. One configuration of overlap is with the fingers of one set positioned over the gaps between the fingers of the other set(s), so that a more efficient gas enclosure is maintained. Another configuration is with the fingers of one set positioned outboard and/or inboard of the fingers of the other set(s), so that if fingers of one set are not in full contact with the work, then the fingers of the other set(s) can provide the required baffling function.

The scope of the present invention is broad enough to encompass the mounting of a flexible, gas-flow permeable baffle made of elastic, heat-resistant material on the end of the shielding gas nozzle without a skirt, without baffle filler material and without a baffle filler sheath, all of which are optional. In the case of a helical coil spring having its ends joined together, large bubbles can be formed as the pressurized inert gas is forced between adjacent turns of the coil. When these bubbles collapse, water rapidly displaces the gas inside the bubble, causing implosion or splashing of water. Such splashing can jostle the position of the gas/liquid interface, which ideally should be maintained in a steady quasi-equilibrium, and can even cause back-washing of water through the exclusion device. The use of gas flow-permeable filler material, e.g., a porous open-cell structure, reduces the size of the bubbles emerging from the baffle structure, thereby reducing the amount of splashing.

In accordance with another preferred embodiment (shown in FIG. 4), a weld cup assembly 30 comprises a weld cup 32. The upper portion of the internal surface of weld cup 32 is threaded so that the gas cup can be screwed onto a conventional welding torch. An upper end of a bellows 38 is mounted to the outer surface of weld cup 32 by means of an o-ring holder 36, to which the bellows is attached (e.g., by solder, braze or glue). The bellows convolutions are slidable along the weld cup 32, which allows the bellows to freely expand and contract in the axial direction.

The O-ring holder 36 is mounted on the weld cup by a tight interference fit. The O-ring 34 seated in an annular recess in holder 36 forms a seal to block the escape of gas between the bellows and gas cup. To prevent upward relative displacement of O-ring holder 36 when the bellows is compressed, a collar (not shown) can be clamped around the gas cup 32 at an axial position in abutment with the holder 36. Thus, the clamped collar acts as a stop to block upward displacement of O-ring holder 36 relative to the gas cup. Because the O-ring holder 36 is not permanently secured to the weld cup, the axial position of the O-ring holder can be adjusted (prior to use of the equipment) to achieve a desired electrode-to-work surface distance.

A gland assembly comprises a gland 44, an electrically insulating washer 42 and a washer 40, screwed together by a plurality of electrically insulating screws 46. This gland assembly is mounted to the bellows by attaching the washer 40 to the bottom end of the bellows 38 (e.g., by solder, braze or glue). The gland 44 has a toroidal recess in which a canted coil spring 48 is installed. The gland recess is shaped to hold the coiled spring. As was the case for the first preferred embodiment, the toroidal volume inside the coiled spring 48 can be occupied by a sheath filled with baffle filler material. As previously described, the turns of the coil compress and tilt to compensate for undulations in the work surface.

Figure 4:
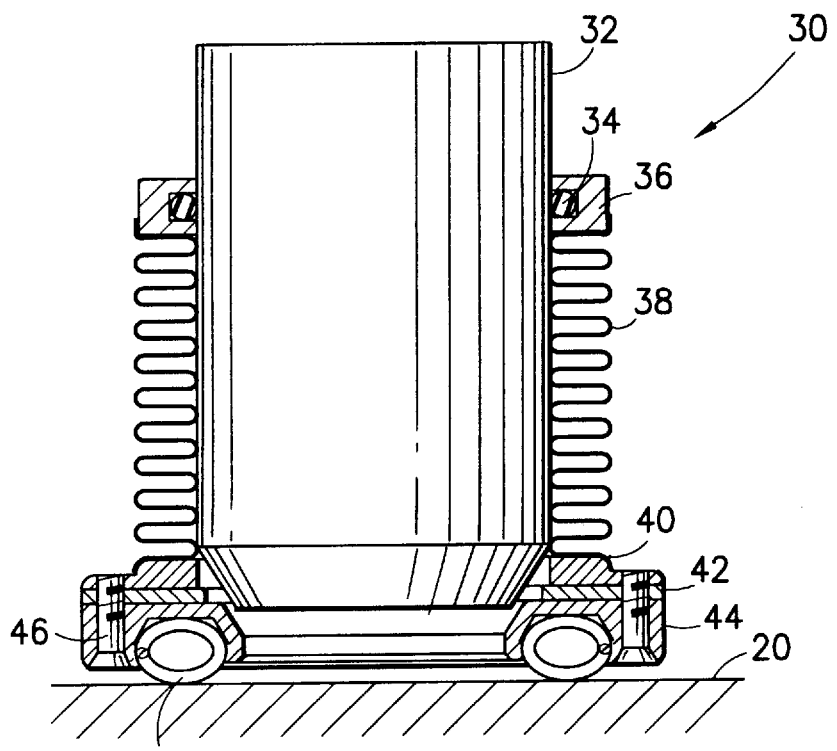
FIG. 4 is a schematic showing a sectional view of a weld cup assembly in accordance with a second preferred embodiment of the invention.

In an exemplary construction of the preferred embodiment depicted in FIG. 4, the weld cup 32 was made of copper; the bellows 38 was made of nickel; the electrically insulating washer 42 was made of Teflon; the electrically insulating screws 46 were made of nylon; and the O-ring holder 36, washer 40, gland 44 and spring 48 were made of Type 304 stainless steel.

The above-described devices for excluding water from a local dry environment during an underwater PTA welding process can be used to improve the reliability and quality of various other welding and thermal processing applications, both in and out of the nuclear energy field. The processes which can benefit from the device include, but are not limited to, plasma transferred arc welding, gas tungsten arc welding, metal inert gas welding, flux cored arc welding, laser welding, plasma transferred arc cutting, heat treating and plasma spraying. The device is best utilized in a mechanized torch movement application, but may also be used for manually controlled processes, with the water exclusion device potentially acting as an arc length (or electrode/torch standoff position) control as well. In this case the arc length is essentially constant, however, the device can be integrated with an automatic voltage control subsystem as well for applications using a transferred arc.

Various industries can benefit from use of the invention, including the offshore marine, shipbuilding and maintenance industries, or on-shore work in pools or flooded tanks and pressure vessels. Various applications of the process include production processing both in the shop and in the field, mitigation and maintenance, as well as repair and decommissioning, An additional benefit is that environmental pollution control is enhanced when thermally processing metals in an underwater environment, without sacrifice of the typically dry process quality, which is maintained due to the local drying capability of the water exclusion device.

The preferred embodiments of the water exclusion device of the invention have been disclosed for the purpose of illustration. Variations and modifications of the disclosed preferred embodiments which fall within the concept of this invention will be readily apparent to persons skilled in the design of underwater thermal processing equipment. For example, the gas cup 10 and skirt 24 need not have a circular cross section. The coiled spring 22, being flexible, can be nested in a skirt having a non-circular shape, e.g., oval or rectangular. All such variations and modifications are intended to be encompassed by the claims set forth hereinafter.

I claim:

1. A submersible thermal processing apparatus comprising:
   a torch comprising a heat source, a torch housing and an inlet for pressurized gas;
   a shielding gas nozzle mounted to said torch housing and surrounding at least a portion of said heat source, said shielding gas nozzle having a distal end; and
   a baffle enclosure made of elastic, heat-resistant spring material arranged in a closed loop and supported by said distal end of said shielding gas nozzle, wherein said baffle enclosure comprises a multiplicity of portions which can flex apart to form a multiplicity of openings for passage of gas through said baffle enclosure.

2. The submersible thermal processing apparatus as defined in claim 1, wherein said baffle enclosure is a helical coil having its ends joined.

3. The submersible thermal processing apparatus as defined in claim 2, wherein said baffle enclosure has an elliptical cross section.

4. The submersible thermal processing apparatus as defined in claim 2, wherein the turns of said coil are canted relative to a circumferential axis of said coil.

5. The submersible thermal processing apparatus as defined in claim 2, wherein the space inside said coil is occupied by a flexible, substantially fluid-permeable structure.

6. The submersible thermal processing apparatus as defined in claim 5, wherein said flexible, substantially fluid-permeable structure comprises a metal mesh.

7. The submersible thermal processing apparatus as defined in claim 5, wherein said flexible, substantially fluid-permeable structure comprises a matrix of porous open-cell material.

8. The submersible thermal processing apparatus as defined in claim 5, wherein said flexible, substantially fluid-permeable structure comprises a matrix of fluid-permeable filler material and a fluid-permeable sheath interposed between said coil and said filler material.

9. The submersible thermal processing apparatus as defined in claim 2, wherein the space inside said coil is occupied by a flexible, substantially fluid-impermeable structure.

10. The submersible thermal processing apparatus as defined in claim 2, further comprising a skirt made of a heat-resistant, flexible material which surrounds said baffle enclosure.

11. The submersible thermal processing apparatus as defined in claim 1, wherein said shielding gas nozzle comprises a first portion which is axially displaceable relative to a second portion.

12. The submersible thermal processing apparatus as defined in claim 11, wherein said shielding gas nozzle further comprises a bellows which couples said first portion to said second portion.

13. A water exclusion device adapted for attachment to a periphery of an open end of a shielding gas nozzle and contact with an opposing workpiece surface, comprising:
   a helical coil having its ends joined, said helical coil being made of elastic, heat-resistant spring material; and
   a flexible structure arranged inside said helical coil.

14. The water exclusion device as defined in claim 13, wherein said helical coil has an elliptical cross section.

15. The water exclusion device as defined in claim 13, wherein the turns of said helical coil are canted relative to a circumferential axis of said coil.

16. The water exclusion device as defined in claim 13, wherein said flexible structure is substantially fluid permeable.

17. The water exclusion device as defined in claim 13, wherein said flexible structure is substantially fluid impermeable.

18. The water exclusion device as defined in claim 16, wherein said flexible, substantially fluid-permeable structure comprises a matrix of fluid-permeable filler material and a fluid-permeable sheath interposed between said coil and said filler material.

19. A submersible thermal processing apparatus comprising:
   a torch comprising a heat source, a torch housing and an inlet for pressurized gas;
   a shielding gas nozzle mounted to said torch housing and surrounding at least a portion of said heat source, said shielding gas nozzle having a distal end; and
   a helical coil having its ends joined, said helical coil being made of elastic, heat-resistant spring material and supported by said distal end of said shielding gas nozzle.

20. The submersible thermal processing apparatus as defined in claim 19, further comprising a flexible, substantially fluid-permeable structure arranged inside said helical coil.

* * * * *